United States Patent Office 3,475,903
Patented Nov. 4, 1969

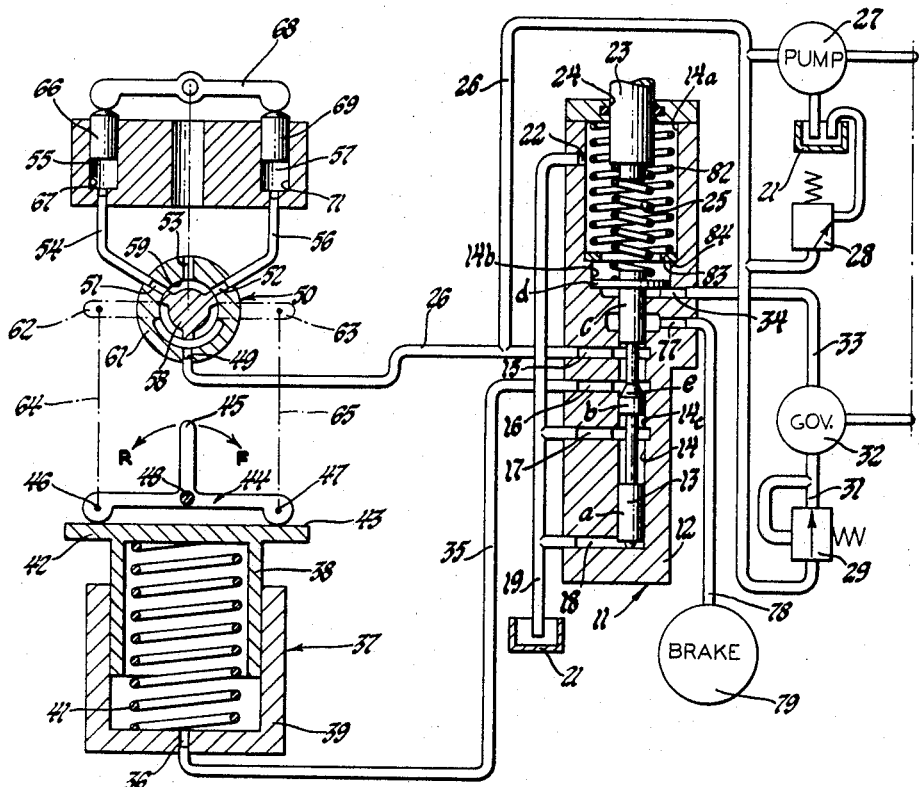

3,475,903
C-6 HYDROSTATIC TRACTOR TRANSMISSION
Howard W. Christenson, Indianapolis, Ind., assignor to General Motors Corporation, Detroit, Mich., a corporation of Delaware
Filed Feb. 28, 1968, Ser. No. 709,007
Int. Cl. F15b 15/18; F16h 39/00
U.S. Cl. 60—19                                         9 Claims

ABSTRACT OF THE DISCLOSURE

Herein disclosed is a control for a variable displacement hydrostatic drive unit which is operable to reduce the power input to the unit from an engine, by adjusting the displacement of the unit, to prevent engine overloading. The control is comprised of a valve member, opened and closed by engine throttle and engine speed signals respectively and a stroke limiting mechanism which operates in response to control fluid delivered by the valve member to limit the displacement of a hydrostatic unit. The valve member also has a brake port which is opened at a predetermined governor speed to actuate the vehicle brakes thereby preventing engine overspeed.

---

This invention relates to engine driven hydrostatic unit controls and more particularly to controls which limit the power input required by the unit from a prime mover.

The control includes an engine driven control pump, which supplies control fluid for the system, an anti-stall and overspeed preventing valve and a displacement limiting unit. The valve directs fluid, from the pump, either to the displacement unit or to exhaust as determined by the biasing forces of engine throttle, and engine governor which act on the valve. The valve also directs fluid, from the control pump to vehicle brake, in the event that the engine governor senses engine overspeed, thus applying the brakes to reduce vehicle speed and prevent engine overspeed.

This invention is particularly useful in hydrostatic drives for vehicles wherein the operator manually controls the drive ratio between the hydrostatic units by controlling the displacement of the hydrostatic pump or motor or both. The present invention permits the operator to select any drive ratio that will not overload or overspeed the engine. In the event the driver attempts to select a drive ratio which would be detrimental to the engine, the control device automatically becomes operative to limit the range from which the operator may select a drive ratio.

The power requirements of a hydrostatic pump is a function of pump displacement, system pressure and pump speed. In the event that the power requirement of the pump exceeds the power output capability of the prime mover, one of the above parameters must be adjusted. The system pressure is a function of the load; for example, a hydrostatic motor, to be driven by the pump so that a reduction in system pressure would reduce the amount of load that could be driven by the pump. If the pump is driven directly by the prime mover, generally a reduction in prime mover speed will result in a reduction in the power output of the prime mover and will not relieve the overload situation. The pump displacement can be reduced without affecting the amount of load that is driven by the pump. The speed of the load will be reduced but the torsional or force output will be unchanged. Thus the present control will limit the power absorbing capabilities of the hydrostatic pump to the power output capabilities of the prime mover by controlling the maximum pump displacement that can be set by the operator.

It is an object of this invention to provide a control for a hydrostatic unit which will limit the power absorbing capacity of the hydrostatic unit to prevent overload of the prime mover.

Other objects and advantages will be more apparent from the following description and drawings in which:

FIGURE 1 is a view partly in section and partly diagrammatic showing the control valve, the stroke limiter and connecting circuitry.

FIGURE 2 is a diagrammatic view showing the use of the invention in a hydrostatic transmission.

Referring to the drawings, there is shown in FIGURE 1 an anti-stall and overspeed protection valve 11 having a valve body 12 and a valve spool 13. The valve body 12 has a bore 14 consisting of three different sized diameters 14a, 14b, and 14c. The valve spool 13 has three equal size lands a, b, and c slidably disposed within diameter 14c of valve bore 14 and a larger diameter d which is slidably disposed in diameter 14b of bore 14. The land b has a tapered portion e between lands c and b, which serves to throttle fluid flow from port 15 to port 16 as valve land b moves across port 16, thus controlling the amount of fluid which flows from port 15 to port 16. The inlet port 15 is connected to diameter 14c between lands b and c and an outlet port 16 which is connected to diameter c when the valve 11 is at rest in the position shown. Two exhaust ports 17 and 18 connect diameter 14c via exhaust passage 19 to a sump 21. The exhaust passage 19 is also connected to diameters 14a and 14b via exhaust port 22. The valve 11 further contains a throttle linkage member 23 which extends through an opening 24 at one end of the valve body 12 and a spring 25 held in compression between member 23 and land d of the valve spool 13. The spring 25 functions to urge the valve spool 13 downward to the position shown such that ports 15 and 16 are in fluid communication between lands b and c of valve spool 13 while the exhaust port 17 is closed to outlet port 16 by land b of the valve spool 13. The inlet port 15 is connected via passage 26 to a source of control fluid for the system such as engine driven pump 27. Pump 27 is also connected via passage 26 to a relief valve 28 which establishes maximum control pressure and a reducing valve 29. Reducing valve 29 supplies pressure from pump 27 via passage 31 to an engine driven governor 32 which, in turn, delivers a control signal proportional to engine speed via passage 33 to a governor port 34 of the valve body 12. The reducing valve 29 limits the pressure in passage 31 since the input pressure to the governor does not have to be at the same level as the control pressure for the control system. The governor port 34 is connected to diameter 14b of bore 14 in land d of valve spool 13 opposite the spring 25. Thus, any governor signal present in passage 33 tends to resist the action of spring 25 and to move the valve spool 13 upward when the governor signal is sufficient to overcome the force of spring 25.

The outlet port 16 is connected via passage 35 to port 36 of a limit control motor 37. The limit motor 37 has a piston 38, slidably disposed in a cylinder 39 and a spring member 41 which is held in compression between the piston 38 and the bottom of cylinder 39. The piston has an expanded end 42 which has a flat surface 43 on its upper side. Contacting the flat surface 43 is a servo control 44 which is rotatably mounted on a pivot pin 48 and has a manual lever 45 and two servo input linkage connections 46 and 47.

The passage 26 is also connected through an inlet port 49 to a servo control valve 50 which has a forward port 51, a reverse port 52 and an exhaust port 53. The forward port 51 is connected via passage 54 to a forward stroking motor 55 while a reverse port 52 is connected via passage 56 to a reverse stroking motor 57. The servo control valve 50 also has a spool valve 58 rotatable in a bore 59 of a housing 61 which is connected to control levers 62 and 63. Control levers 62 and 63 are operatively connected, by linkages shown diagrammatically as 64 and 65, to input connections 46 and 47, respectively, of servo control 44. The stroking motor 55 has a piston 66 slidably mounted in a bore 67 and abutting a swash plate 68 of a pump. The stroking motor 57 has a piston 69 slidably mounted in a bore 71 abutting the swash plate 68. The swash plate 68 is operatively connected to the spool valve 58. Thus upon forward or reverse rotary movement of manual lever 45, the housing 61 is rotated by the control lever 62 or 63 thereby permitting fluid in passage 26 to be admitted to stroke control motor 55 or 57 via port 51 or 52 and passage 54 or 56 respectively whereby the pressure of the fluid will act on motor 55 or 57 causing the piston 66 or 69 to move against the swash plate 68. Thus the swash plate 68 will be rotated thereby causing a change in the displacement of the hydrostatic unit. Simultaneously with the rotation of the swash plate, the valve spool 58 will be rotated causing the servo control valve 50 to be centered so that inlet port 49 is closed to forward and reverse ports 51 and 52. The swash plate 68 will remain in this position until the servo control valve 50 is moved by the servo control 44.

The servo control 44 may also be operated by the limit control motor 37 under the influence of fluid in passage 35. The fluid in passage 35 may be at the level of either the control pressure fluid in line 26 or the exhaust pressure fluid in passage 19 or intermediate these two levels. The pressure level of the fluid in passage 35 is controlled by the position of valve spool 13, which is determined by throttle position through linkage 23 and spring 25 and governor pressure in port 34 acting on land $d$ of valve spool 13. Thus if the throttle signal, as represented by spring 25, is higher than the governor signal, the valve spool 13 will move downward to permit control fluid from passage 26 to enter passage 35 while if the governor signal is higher, the valve spool 13 will move upward to exhaust passage 35. If the pressure level of the fluid in passage 35 is high, the piston 38 of limit control motor 37 will move upward against the servo control 44 to urge it toward the center position, as shown. As the servo control 44 is moved toward center, the swash plate will be moved toward center, the swash plate will be moved toward center, under the influence of the servo control valve 50, as described above.

In operation, if the operator moves lever 45 to a position requiring the servo control valve 50 to urge the hydrostatic unit to a larger displacement, in either the forward or reverse direction, but the engine power output is not at a sufficient power level to drive the hydrostatic unit at this displacement, for example, at low throttle settings or low engine speeds, the control pressure in line 35 will be effective through piston 38 of the limit control motor 37 to move the servo control 44 toward center overcoming the force of the operator on lever 45 thus limiting the maximum displacement of the hydrostatic unit so that the engine is not overloaded. The limit control motor 37 will continue to limit the maximum displacement until the engine speed increases sufficiently, due to a decrease in load on the hydrostatic unit, so that the governor signal can overcome the throttle signal; or the throttle signal, as represented by spring 25, is reduced so that acceleration of the load is no longer required, such as when the operator has achieved the desired output with the engine speed remaining constant. The limit control will not affect the minimum displacement of the hydrostatic unit as that is established by the operator through lever 45 and servo control 44. Thus, if the control limits the displacement at one value, the operator can still establish any displacement between that and zero.

FIGURE 2 shows a hydrostatic vehicle drive in which a hydrostatic pump 72 is driven by an engine 73 to cause the hydrostatic pump 72 to deliver hydraulic fluid to a hydrostatic motor 74 which, in turn, drives the vehicle wheels of track bogies 75 and 76. If during the course of operating the vehicle, downhill coasting is encountered, the hydrostatic motor 74 will be driven by the rear wheels 75 and 76 so that it will operate as a pump to deliver fluid to the hydrostatic pump 72 which, in turn, will act as a motor to drive the engine 73. In this situation, with the engine being driven by the vehicle, the engine can be overspeeded. To prevent overspeeding, the control valve 11 has a brake port 77 which is opened by land $c$ of valve spool 13 to passage 26 when the governor signal indicates that an engine overspeed condition is about to occur. When the port 77 is opened, control fluid is delivered via passage 78 to the vehicle brakes 79 thereby actuating the brake 79 to slow the vehicle and prevent engine overspeeding. The passage 78 has a constant leak restriction 81 which permits the brakes 79 to be exhausted when the port 77 is closed by valve spool 13. The minimum governor signal which will open the brake port 77 is determined by the force in spring 25 and the force in spring 82. The spring 82 is held in compression between the end of bore 14 at diameter 14$a$ and an abutment ring 83 which rests against a shoulder 84 between diameters 14$a$ and 14$b$. Thus the spring 82 does not affect the limit control motor 37 but is only functional to establish the pressure level which the governor 32 must achieve before the vehicle brakes 79 will be applied. However, since the throttle control spring 25 is also active, the engine speed, at which the vehicle brakes 79 are applied, will vary between closed throttle and full throttle positions.

Many modifications and variations are possible in light of the above teachings. It is, therefore, to be understood that within the scope of the appended claims, the invention may be practiced otherwise than as specifically described.

What is claimed is:

1. In an engine driven hydraulic pump control the combination comprising an engine having throttle control means, governor control means and drive means; a variable displacement pump driven by said drive means; displacement control means for said pump including a movable member and fluid operated motor means for moving said movable member; source means for providing fluid pressure, operatively connected to said throttle control means, said governor control means and said fluid operated motor means for controlling said fluid operated motor means, including valve means having an open and closed position and being responsive to said throttle control means and said governor control means for providing when said throttle control means is greater than said governor control means said valve means is operative to control the flow of fluid to said fluid operated motor means to limit the displacement of said pump.

2. The invention defined in claim 1 and said valve means comprising a valve body including a valve bore therein with an inlet port in fluid communication with said source, an outlet port in fluid communication with said motor means, and an exhaust port; a valve spool having a plurality of lands slidably disposed in said valve bore such that when said valve means is opened said inlet port is in communication with said outlet port between two of said lands and when said valve means is closed said outlet port is in communication with said exhaust port between one of said aforementioned lands and another land; and a chamber between a portion of said valve bore and said valve spool.

3. The invention defined in claim 2 and said throttle control means including a linkage and a spring held in compression between said linkage and said valve spool, said spring being operable to supply a variable force to said valve spool in response to movement of said linkage; and said governor control means including a source of variable fluid pressure proportional to the speed of the engine, and passage means operatively connecting said source of variable fluid pressure with said chamber, said governor control means being operable to supply a variable proportional to engine speed to said valve spool.

4. In a vehicle drive: an engine having a throttle control means, governor signal means and drive means; a variable displacement hydraulic pump driven by said drive means; a hydraulic drive motor having output means; a hydraulic drive circuit connecting said hydraulic pump and drive motor to provide fluid communication therebetween; drive means driven by said output means; displacement varying means for varying the displacement of said hydraulic pump comprising a movable member, control motor means for controlling the movement of said movable member, a source means for providing fluid pressure, operatively connected to said throttle control means, said governor signal means, and said control motor means, including valve means, responsive to said throttle control means and said governor means, having an opened and closed position whereby said motor means is supplied with fluid when said valve means is opened by said throttle control means to thereby limit the displacement of said hydraulic pump and said motor means is exhausted when said valve means is closed by said governor signal means; and vehicle brake means operatively connected to said driven means being actuatable in response to fluid supplied from source of fluid pressure through said valve means when said governor signal means is above a predetermined value.

5. In a hydrostatic transmission the combination comprising drive and driven means; throttle control means; governor control means responsive to said drive means; a variable displacement pump driven by said drive means and in fluid communication with said driven means; displacement control means for said pump including a movable member and fluid operated motor means for moving said movable member; a source of fluid pressure; and valve means, connected between said source of fluid pressure and said motor means and being operatively connected to said throttle control means and said governor control means, having an open and closed position and being responsive to said throttle control means and said governor control means to control the flow of fluid to and from said fluid operated motor means to operate said fluid operated motor means to limit the displacement of said variable displacement pump thereby limiting the power absorbing capabilities of said variable displacement pump.

6. The invention defined in claim 5 and said valve means including a valve bore, a valve spool slidably disposed in said valve bore, and fluid chamber means between a portion of said valve bore and said valve spool; said engine throttle control means including a linkage, and spring means between said linkage and said valve spool and being operable to apply a variable throttle force to said valve spool; and said governor control means including a variable source of fluid pressure proportional to the speed of said drive means and fluid passage means operatively connecting said variable source of fluid pressure and said fluid chamber means and being operable to apply a variable governor force to said valve spool.

7. The invention defined in claim 6 and said valve spool having flow control means to control the flow of fluid from said source to said motor means when said valve means is between said open and closed positions.

8. The invention defined in claim 6 wherein said variable throttle force opposes said variable governor force to open said valve means when said variable throttle force exceeds said variable governor force and to close said valve means when said variable governor force exceeds said variable throttle force.

9. The invention defined in claim 8 and said driven including fluid operated brake means, and said valve means further including a brake position to connect said source of fluid pressure to said brake means in response to a predetermined governor force.

References Cited

UNITED STATES PATENTS

| | | | |
|---|---|---|---|
| 3,003,309 | 10/1961 | Bowers et al. | 60—19 |
| 3,302,390 | 2/1967 | Christenson et al. | 60—19 |
| 3,371,479 | 3/1968 | Yapp et al. | 60—19 |

EDGAR W. GEOGHEGAN, Primary Examiner

U.S. Cl. X.R.

60—52

PO-1050
(5/69)

UNITED STATES PATENT OFFICE
CERTIFICATE OF CORRECTION

Patent No. 3,475,903          Dated November 4, 1969

Inventor(s) Howard W. Christenson

It is certified that error appears in the above-identified patent and that said Letters Patent are hereby corrected as shown below:

Column 3, line 45, cancel beginning with "the swash" to and including "center," in column 3, line 46.

Column 6, line 28, after "driven" insert -- means --

SIGNED AND
SEALED
FEB 17 1970

(SEAL)
Attest:

Edward M. Fletcher, Jr.
Attesting Officer

WILLIAM E. SCHUYLER, JR.
Commissioner of Patents